(12) United States Patent
Wozniak et al.

(10) Patent No.: US 6,283,891 B1
(45) Date of Patent: Sep. 4, 2001

(54) AUTOMATIC TRANSMISSION FOR AN AUTOMOTIVE VEHICLE WITH A SHIFT CONTROL FOR LAUNCH ASSIST AND MANUAL UPSHIFTS

(75) Inventors: Kenneth Paul Wozniak, Chelsea; Richard Leon Lavigne, Brighton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/545,476

(22) Filed: Apr. 7, 2000

(51) Int. Cl.[7] .................................................. B60K 41/20
(52) U.S. Cl. ................................................................ 477/94
(58) Field of Search .......................................... 477/94, 93

(56) References Cited

U.S. PATENT DOCUMENTS

| | | | |
|---|---|---|---|
| 4,645,051 | * | 2/1987 | Maezono et al. ....................... 477/94 |
| 4,665,777 | * | 5/1987 | Kikuchi et al. ........................ 477/94 |
| 4,694,709 | * | 9/1987 | Kikuchi et al. ........................ 477/94 |
| 5,272,630 | | 12/1993 | Brown et al. . |
| 5,642,283 | | 6/1997 | Schulz et al. . |
| 5,646,842 | | 7/1997 | Schulz et al. . |
| 6,007,445 | | 12/1999 | Kirchhoffer et al. . |

* cited by examiner

*Primary Examiner*—Dirk Wright
(74) *Attorney, Agent, or Firm*—Frank G. McKenzie

(57) ABSTRACT

A shift control and shift strategy for an automatic transmission in an automotive vehicle driveline wherein the automatic ratio shift schedule can be disabled selectively to accommodate a manual ratio shift control. A driver-operated mode selection switch permits the operator to select normal automatic ratio control or a launch-assist mode during operation in the normal ratio shift mode. Ratio changes occur in response to driveline operating variables in a vehicle launch-assist mode. The transmission control system is commanded to effect a high speed ratio when the vehicle is stationary with the brakes applied. The operating mode defaults to a normal ratio shift mode as the operator releases the wheel brakes. In an alternative embodiment of the invention, the control includes multiple enable switches for achieving manual selection of the ratios when a manual upshift sequence is desired.

8 Claims, 5 Drawing Sheets

AUTOMATIC TRANSMISSION FOR AN AUTOMOTIVE VEHICLE WITH A SHIFT CONTROL FOR LAUNCH ASSIST AND MANUAL UPSHIFTS

TECHNICAL FIELD

The invention relates to the control of ratio changes in a multiple-ratio automatic transmission for an automotive vehicle driveline.

BACKGROUND ART

It is known design practice to modify an automotive vehicle driveline to adapt it for drag-race applications. This typically would require incorporating a transmission brake function within the transmission housing to lock the transmission in a static condition when the vehicle brakes are applied and the engine throttle is advanced at the initiation of a launch of the vehicle. The internal transmission lock permits the operator to hold the vehicle at the starting line while applying full engine torque. The wheel brakes normally would lack sufficient braking capacity for such conditions.

Such modifications to the transmission for drag-race applications involve extensive redesign of the transmission to accommodate an internal transmission lock. At the instant of the launch, the internal transmission lock is released. This allows maximum launch acceleration to be achieved since the engine is held at its optimum stall speed prior to the launch.

The stall speed of the engine is determined by the torque converter size factor and by the engine torque available. The torque converter size factor, a well known design characteristic, is equal to the engine speed divided by the square root of the turbine torque.

The vehicle brakes and the internal transmission lock are applied as the throttle is advanced to a position at or near the wide-open throttle position. Takeoff or launch occurs as the vehicle brakes and the internal transmission lock are released.

In a typical driveline that has been modified for drag-race applications, the vehicle can be maintained in the stalled state at launch with the engine operating at a higher power level only if additional braking is provided to complement the wheel braking.

DISCLOSURE OF INVENTION

The invention is adapted particularly to be used with multiple-ratio automatic transmissions for automotive vehicles in which ratio changes are under the control of a driveline electronic controller. The controller responds to changes in driveline variables, including throttle position, engine speed, vehicle speed and turbine speed. The control system of the invention has at least two operating modes: (1) a normal automatic ratio-changing mode; and (2) a launch-assist mode wherein the automatic ratio-changing mode is overruled and replaced by a mode in which the transmission is maintained, in a high gear ratio (usually the highest gear ratio), until the launch is initiated.

At the start of the launch, the transmission automatically converts to an automatic upshift mode wherein the lowest gear ratio is activated for maximum acceleration and wherein ratio changes in response to changing operating variables in the driveline take place through the available range of speed ratios. The effective torque at the output shaft of the transmission is reduced at stall because the transmission is held in its optimum speed ratio gear, usually the highest gear ratio. This allows the vehicle brakes to hold the vehicle powertrain in the stall state without the additional braking capacity of an internal transmission brake or lock. When stall state is terminated, the automatic ratio-changing state is initiated in response to the release of vehicle wheel brakes.

After the vehicle stops, the launch-assist mode is terminated and the normal automatic ratio-changing mode is effected. No re-enabling step is needed.

The input signals to the microprocessor driveline controller would include a wheel brake switch activated upon application of the wheel brakes, a vehicle speed sensor, a transmission range sensor, and a driver-activated launch-assist switch. Although the launch-assist switch could be mounted in a driver control module independently of other driveline controls, it could be incorporated into an existing vehicle switch assembly. Other transmission input signals may be a transmission temperature sensor signal, a throttle position sensor signal, an engine speed sensor signal and a torque sensor signal.

Another feature of the invention is a manual upshift sequence capability that is provided by a driver-operated mode selector switch and an enable switch, whereby manually selected upshifts for the vehicle replace the normal automatic shift sequence during a specific run; that is, during an upshift sequence beginning with the lowest speed ratio to the highest speed ratio. This achieves a limited shift point control for drag-race applications without requiring additional transmission control hardware.

Unlike typical drag-racing transmission modifications, a manual upshift sequence can be used to override the normal upshift sequence. This can be done without the use of special shift valve springs, pressure booster valve changes, and line pressure control springs. The necessary modifications to a typical transmission control system involve only software changes in the transmission electronic controller.

When the operator enters the manual upshift mode, manually selected upshifts are substituted for normal scheduled automatic upshifts. The transmission then will upshift only on the driver's command, which may involve activating an upshift enabling switch. When the highest gear ratio is reached, or when the wheel brakes are applied, the manual upshift sequence mode will be discontinued.

A launch-assist and manual upshift mode is available and can be enabled by the driver as the wheel brakes are applied. The method of the invention includes the step of selecting in sequence the speed ratios from the lowest to the highest ratio as the wheel brakes are released and the vehicle accelerates from a standing start. The manual upshift routine is disabled when the highest speed ratio is achieved.

The launch-assist and automatic ratio upshifting mode can be enabled as the brakes are applied. As previously indicated, high speed ratio in the gearing is established at the beginning of the launch-assist before the brakes are released, whereby the torque delivered to the wheels is reduced.

Application of the brakes results in distribution of a brake signal to the controller to terminate the manual upshift sequence and to substitute the normal automatic upshift sequence for which the driveline is calibrated. The enabling switch, which serves as an upshift switch during operation in the manual upshift sequence mode, can be incorporated into an existing vehicle switch, or it may be an independent add-on switch.

A brake signal from a brake sensor, when the wheel brakes are applied, will interrupt the manual upshift sequence mode. The manual upshift sequence mode is interrupted also when the transmission reaches its highest speed ratio.

BEST MODE FOR CARRYING OUT THE INVENTION

Figure 1:
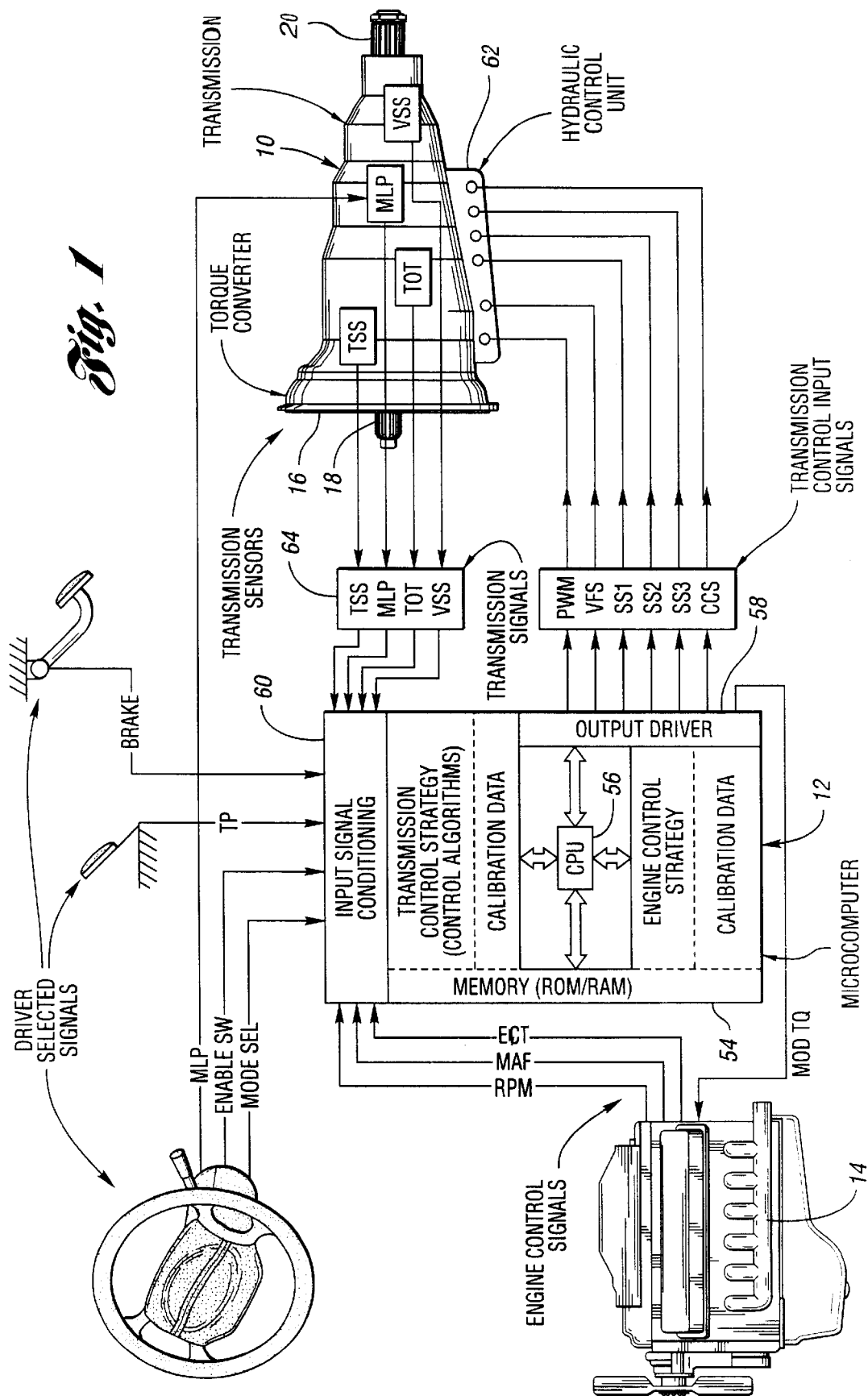
FIG. 1 is a schematic block diagram of an automotive vehicle driveline including a microprocessor controller for activating hydraulic control elements of the transmission.

FIG. 1 shows the overall automotive vehicle driveline, which includes a transmission 10, a microcomputer controller 12, and an engine 14. The crankshaft of the engine 14 delivers driving torque to the impeller of the hydrokinetic torque converter 16, which is drivably connected to torque input shaft 18. The torque output shaft of the transmission is shown at 20.

Reference may be made to U.S. Pat. Nos. 5,646,842, 5,642,283, 6,007,445, and 5,272,630 for a description of the mode of operation of transmission 10. Although those patents describe a typical automatic transmission capable of being used with the invention, it should be understood that any of several known multiple-ratio automatic transmissions having electronic controls can be adapted to accommodate the present invention.

The patents identified above are owned by the assignee of the present invention. Reference may be made to the disclosures in those patents to supplement the present disclosure.

Figure 1A:
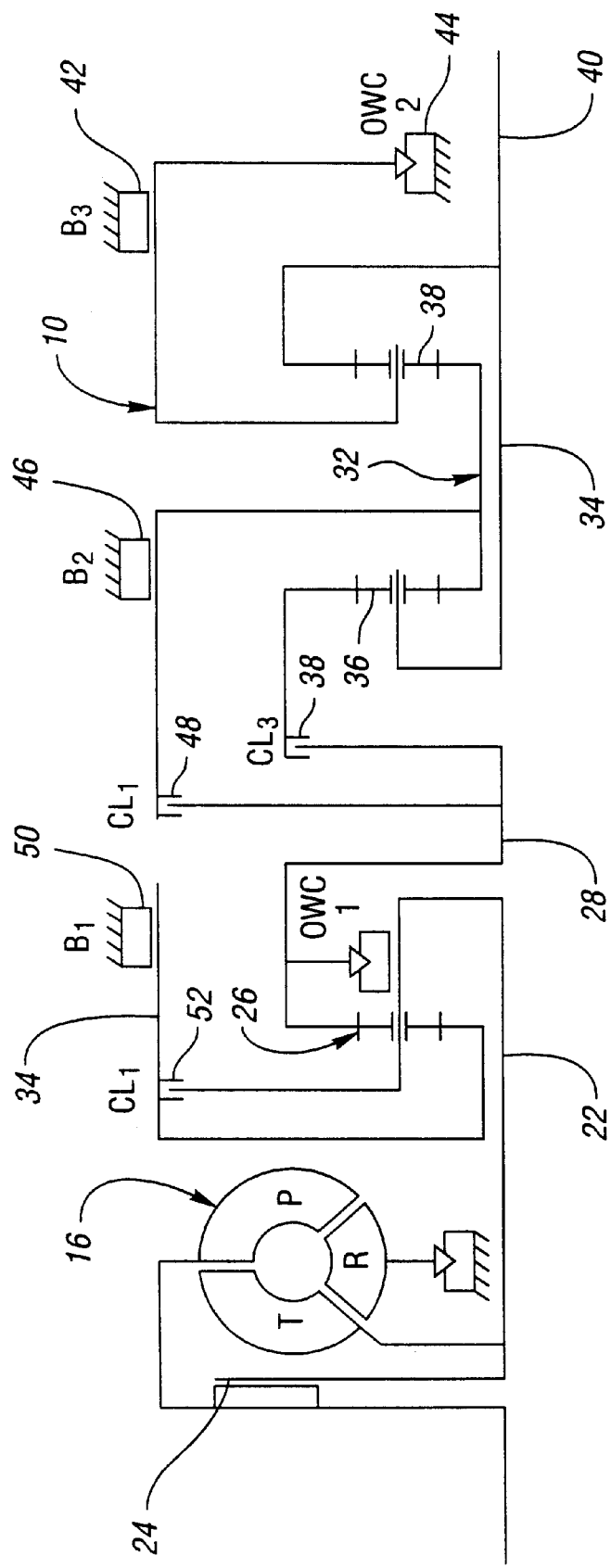
FIG. 1a is a schematic diagram of typical transmission gearing for the driveline system of FIG. 1.

The schematic diagram of FIG. 1a illustrates gearing that would be used in the transmission 10 to achieve four forward-driving ratios and a single reverse ratio. The torque converter 16 includes a pump or impeller P, a turbine T and a reactor or stator R. These converter elements are arranged in toroidal fluid flow fashion in known manner. The impeller P is connected drivably to the engine crankshaft. The turbine is connected to turbine-driven shaft 22. A torque converter lockup clutch 24, when engaged, connects the impeller directly to the turbine.

A simple planetary gearset 26 includes a carrier connected directly to the turbine-driven shaft 22, a sun gear connected to clutch drum 24 and a ring gear connected to shaft 28. An overrunning coupling 30 connects the carrier of the gearset 26 to the ring gear of the gearset 26.

Transmission 10 includes also a compound planetary gearset, sometimes referred to as a Simpson gearset, as shown at 32. It includes separate gear sets with a common sun gear 34. One gearset 36 is connected to shaft 28 through a direct-drive clutch 38. A second gearset of the compound gearset 32 has a ring gear connected to the carrier of gearset 36 and to the driven shaft 40. The carrier of gearset 38 is anchored by brake band 42 and also by an overrunning brake OWC2, shown at 44. Brake 42 is identified by the symbol $B_3$ in FIG. 1. The common sun gear 34 can be anchored by friction brake band 46, which carries the symbol $B_2$. A direct-drive clutch 48, which carries the symbol $CL_2$, connects the sun gear of gearset 36 to the ring gear of the gearset 36 when it is engaged during third-speed ratio operation.

The sun gear for gearset 26 is anchored by a brake band 50 which carries the symbol $B_1$. A coast clutch 52, which carries the symbol $CL_1$, is situated between the carrier and the sun gear with the gearset 26.

The clutch $CL_3$ is engaged during operation in each forward-drive ratio. Brake band $B_3$ is engaged during operation in the lowest speed ratio. Torque at that time is delivered through the overrunning clutch OWC1 to the ring gear of gearset 36. The carrier of gearset 36 and the ring gear of gearset 38 are both connected to the torque output shaft 40 during operation in the lowest speed ratio as the carrier for the gearset 38 acts as a reaction element.

To achieve a ratio change from the lowest ratio to the second or intermediate speed ratio, brake $B_3$ is released and brake $B_2$ is applied as the forward clutch 38 remains applied. The sun gear for the gearset 36 then acts as a reaction element, and the carrier for the gearset 36 delivers the resultant torque to the driven shaft 40.

A ratio change from the intermediate ratio to the high speed ratio is achieved by releasing brake $B_2$ and applying clutch 48. This locks together two elements of the gearing 34 so that the gearing establishes a one-to-one torque ratio.

The fourth ratio is an overdrive ratio, which is achieved as brake band $B_1$, is applied. This anchors the sun gear of gearset 26 so that the ring gear of gearset 26 is overdriven. Shaft 40 is then driven with an overdrive ratio. Overrunning coupling 30 overruns during operation in the overdrive ratio.

Reverse drive is obtained as clutch $CL_3$ is released and clutch $CL_2$ is applied. Brake $B_3$ also is applied so that the carrier for the gearset 38 will act as a reaction point. Torque is delivered through the clutch $CL_2$ to the sun gear for the gearset 38, thereby driving the ring gear for the gearset 38 and the torque output shaft 40 in a reverse direction.

Microcomputer 12 includes a memory portion that contains transmission control strategy and engine control strategy, as well as calibration data, for the transmission and for the engine. The memory portion is shown at 54.

A central processor unit 56 receives control strategy information and data from the memory and delivers an output to the driver portion 58. An input conditioning signal portion 60 receives input signals from the engine as well as driver-selected signals and driver-selected signals. The engine signals are a speed signal (rpm), a torque signal which is functionally related to mass air flow (MAF), and an engine coolant temperature signal (ETC).

The driver-selected signals received by the input signal conditioning portion 60 are a mode selector signal (mode select), an enable switch signal (enable switch), a manual lever position signal (MLP), a throttle position signal (TP), and a brake signal (brake). A torque modifier signal for manipulating the torque of the engine through spark timing or fuel injection regulation is delivered from the output driver portion 58 to the engine, as indicated by the symbol MOD TQ. A torque modification may be necessary if the transmission temperature limits are reached or if certain torque constraints are exceeded.

The microcomputer 12 delivers shift control signals SS1, SS2 and SS3, as well as a converter clutch signal CCS, to the transmission hydraulic unit 62. The transmission develops transmission signals from a vehicle speed sensor (VSS), a manual lever position sensor (MLP), a transmission oil temperature sensor (TOT) and a turbine speed sensor (TSS). The signals are delivered to the input signal conditioning portion 60 through signal flow paths as shown at 64.

Figure 2:
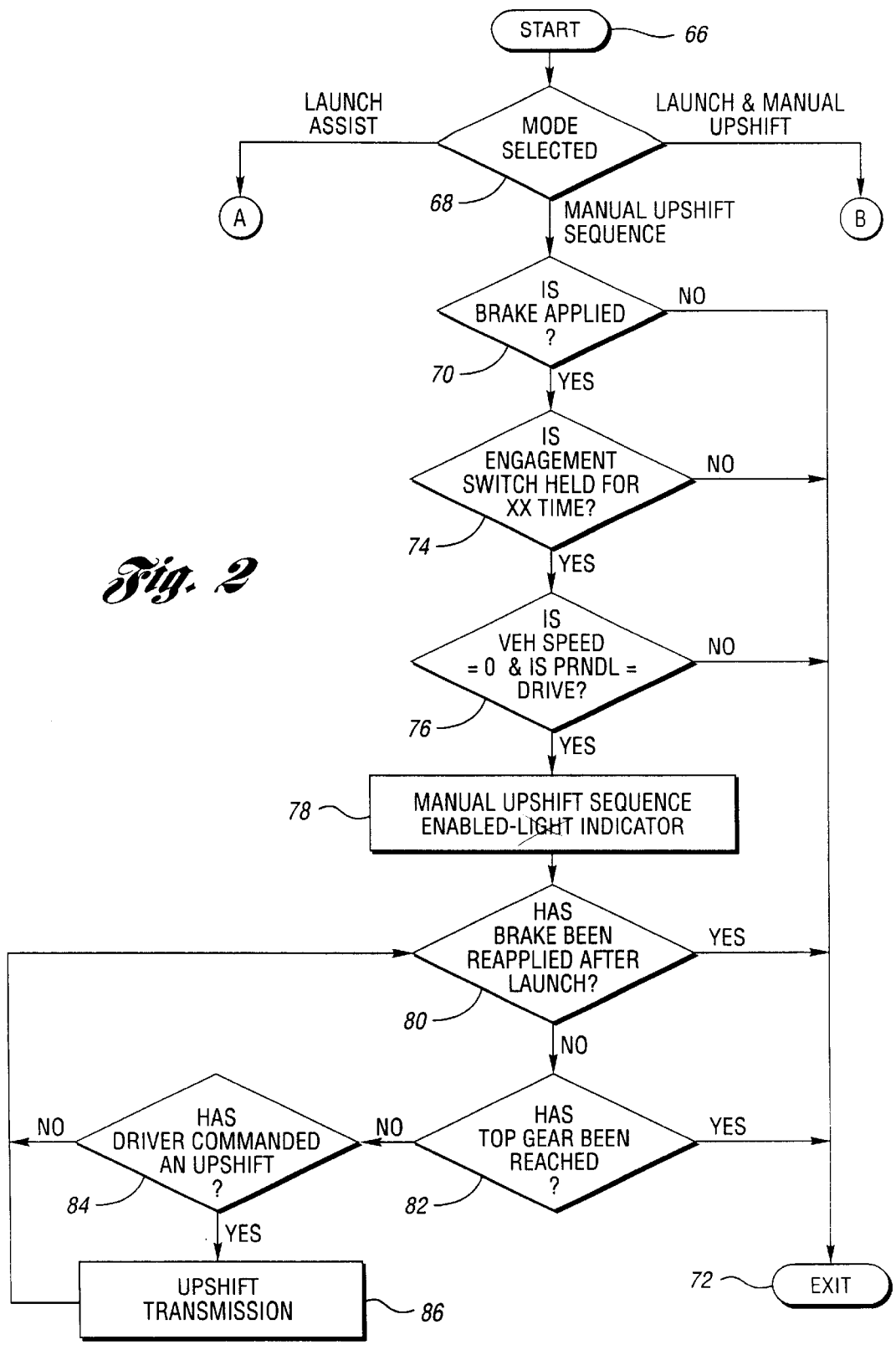
FIG. 2 is a flowchart that demonstrates the control strategy for the control system of the invention when a manual upshift sequence is selected by the operator.

As indicated in the flowchart of FIG. 2, the control strategy at start 66 involves a mode selection by the operator as indicated at 68. This is accomplished as the operator depresses a mode select button (mode select). If the selection calls for a manual upshift sequence, the routine will then advance to step 70, where it is determined whether the vehicle brakes are applied. If the brakes are not applied, the routine cannot continue and the strategy will call for exiting at 72. If the brakes are applied, the routine may continue to step 74, where it is determined whether the engagement switch (enable switch) is held by the operator for a predetermined time measured by a countdown timer in the microcomputer 12. If the switch is not engaged, or if it is not engaged for a designated time, the routine then will exit, as shown at 72.

If the inquiry at step 74 is positive, the routine will continue to step 76 where an inquiry is made to determine whether the vehicle speed is zero and if the manual lever position is in the drive range. If the manual lever position is in the drive range, a manual upshift sequence is available, as shown at 78. The enabling of the manual upshift sequence will cause an indicator light to be illuminated, thereby informing the driver that the transmission is conditioned for the manual upshift sequence. Indicators other than an indicator light also can be used if desired.

The routine then proceeds to step 80 where an inquiry is made as to whether the brakes have been reapplied after the launch. If the brakes are applied, the routine immediately will exit, as shown at 72. If they are not applied, the routine may continue until it is determined at step 82 whether the highest gear ratio has been reached following the launch. If the highest gear ratio has been reached, the routine then is completed. If it has not been reached, it is determined whether the operator has commanded an upshift from the current ratio, as shown at 84. If the inquiry is negative at step 84, the routine will be terminated if it is also determined at 80 whether the brake has been reapplied after launch. If the brake continues to be released, a test is made at 82 again to determine whether the top gear has been reached. This subroutine will continue until it is determined at 84 whether the transmission has been commanded to upshift. If there is an upshift command, the transmission is upshifted, as shown at 86.

Figure 3:
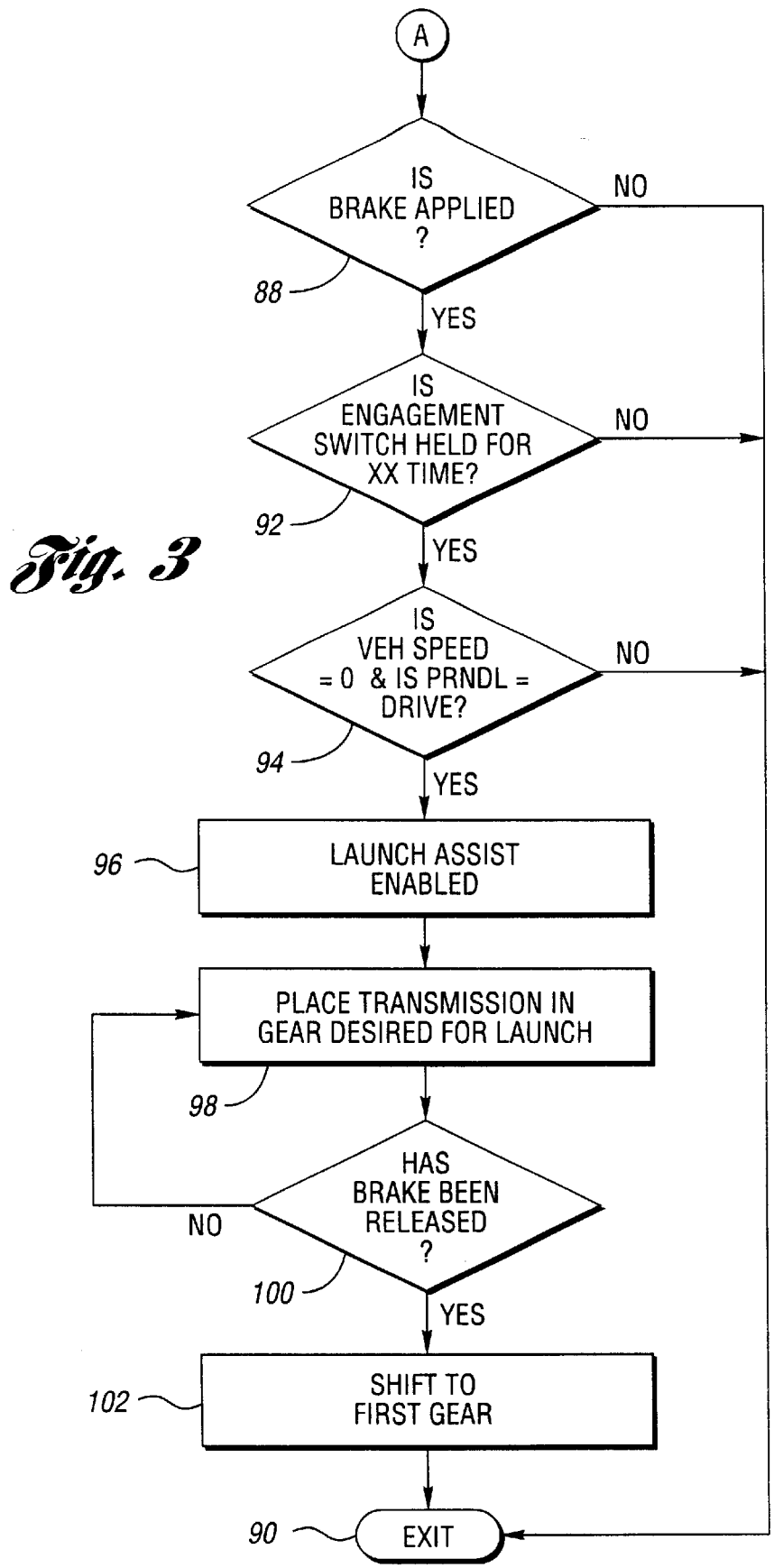
FIG. 3 is a flowchart illustrating the logic steps of the control strategy when the driver selects the launch-assist operating mode.

If a launch-assist mode is selected by the operator at step 68 in FIG. 2, the routine will follow the strategy illustrated in FIG. 3 wherein an inquiry is made as to whether the brakes are applied, as shown at step 88. If the brakes are not applied, the routine is ended as shown at 90. If the brakes are applied, the routine may continue to step 92, where it is determined whether the engagement switch (enable switch) has been held closed for a predetermined length of time. If the inquiry at 92 is negative, the routine ends, as shown at 90. If the inquiry at 92 is positive, the routine will proceed to step 94 where it is determined whether the vehicle is stalled and whether the manual lever is in the drive position. If the vehicle is not stalled and if the manual lever is not in the drive position, the routine ends as shown at 90. If the conditions at 94 are met, the routine will proceed to action block 96, where the launch-assist is enabled.

The next step in the routine calls for placing the transmission in the gear desired for launch. That is, the transmission may be launched from the lowest ratio or at another desired underdrive ratio. Typically, however, the operator would choose the lowest gear ratio for launch.

The routine then proceeds to step 100 wherein an inquiry is made as to whether the brakes are released. If the brakes have been released, the transmission will shift to the first gear, as shown at 102, and the launch-assist mode automatically terminates. Thereafter, the normal upshift sequence will be followed.

Figure 4:
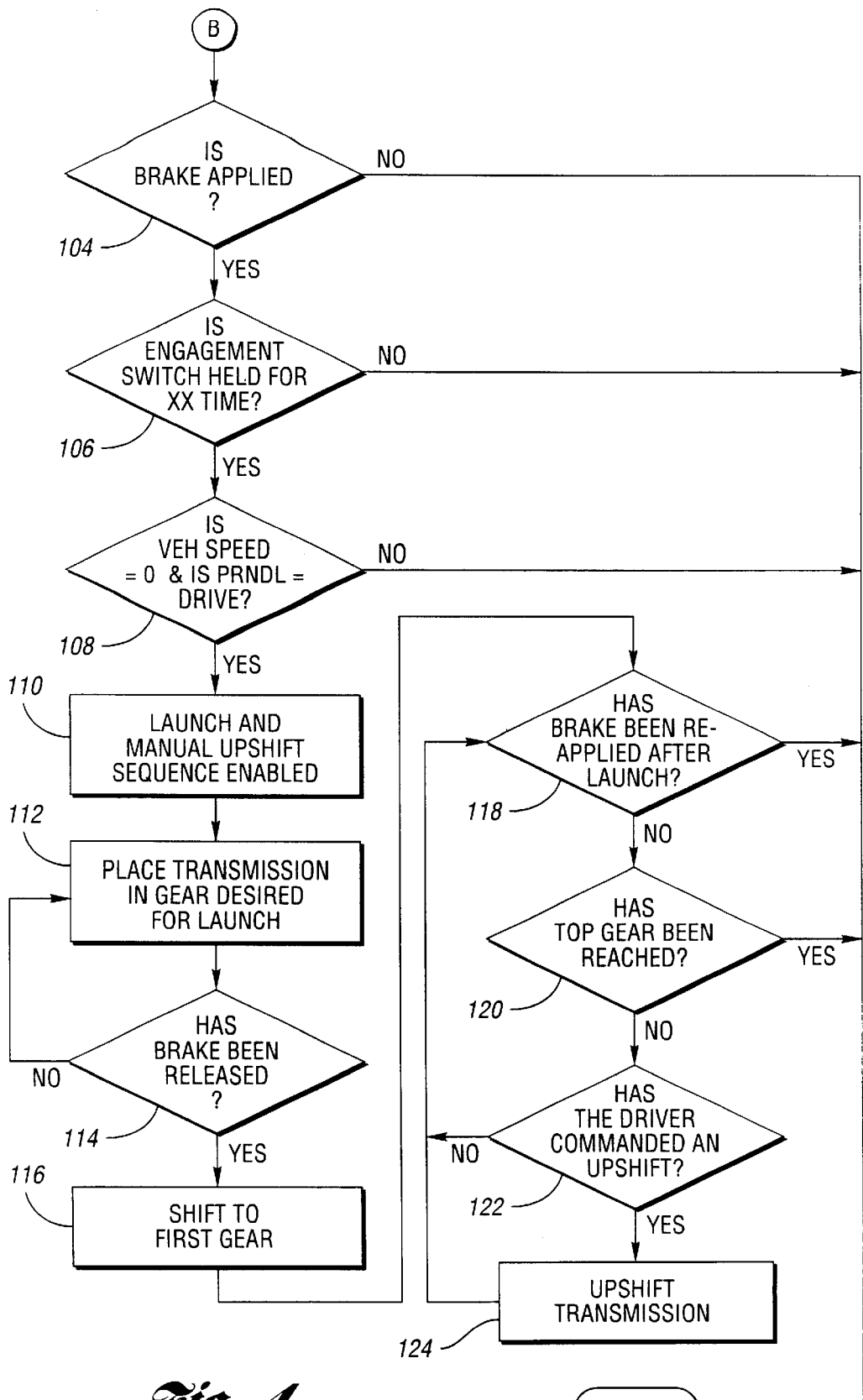
FIG. 4 is a flowchart showing the logic steps of the control strategy that is enabled when the operator selects a launch and manual upshift operating mode.

If the mode selection at step 68 in FIG. 2 calls for a launch and manual upshift mode, the routine set out in FIG. 4 will be followed. This routine essentially is a combination of the routines of FIGS. 2 and 3. Following the launch, when the mode of FIG. 3 is selected, the driver commands the upshifts, and the normal automatic upshift sequence is overruled.

The routine of FIG. 4 begins by inquiring at 104 whether the vehicle wheel brakes are applied. If they are not applied, the routine will exit. If the wheel brakes are applied, the routine may proceed to step 106, where it is determined whether the engagement switch (enable switch) is activated for a predetermined time. If the inquiry at 106 is negative, the routine will exit. If the inquiry is positive, the routine may proceed to action block 108, where it is determined whether the vehicle is stalled and whether the manual lever is positioned in the forward drive position (i.e., the "D" position on the PPNDL indicator). If the vehicle is not stalled or if the manual lever is not in the forward drive position, the routine will exit. If the inquiry at 108 is positive, the launch and manual upshift mode will be enabled at action block 110.

At action block 112, the operator will select, using the enable switch, the gear in which the vehicle will be held stationary prior to the launch. The routine will then proceed to inquire at step 114 whether the brake has been released. If it is released, the transmission is shifted at action block 116 to the first gear. The routine then proceeds to inquire at 118 whether the brake has been reapplied after launch. If it has been reapplied, the routine will exit. If the brake remains released, the routine proceeds to inquire at step 120 whether the top gear has been reached. If it has been reached, the routine will exit. If the top gear has not been reached, an inquiry is made at 122 as to whether the driver has commanded an upshift. If an upshift is commanded, the transmission will upshift at action block 124. If the driver has not commanded an upshift, the routine will return to step 118, where it is inquired again as to whether the brakes have been reapplied after launch.

In the event a temperature signal in excess of a calibrated value is reached, the launch-assist mode or the manual-selection mode can be interrupted. In the alternative, the engine torque can be truncated in order to avoid overheating. In that event, a MOD TQ signal will be delivered by the microcomputer 12 to an engine spark retarder or a fuel controller for engine 14.

An advantage of the invention is the reduction of the chassis loading at the instant of a launch. This reduces inertia load shocks to the driveline.

The invention may be adapted for a multiple-ratio, electronically-controlled automatic transmission without special hardware modifications. The three operating modes that are available can be achieved by making only software modifications to the normal upshift sequence implementing software.

An advantage of the manual upshift mode is the ability of the operator to find and to use ideal shift points for any particular application or for special road conditions for which the usual upshift calibration may not be appropriate.

Although a preferred embodiment of the invention has been disclosed, it will be apparent that persons skilled in the art may make modifications without departing from the scope of the invention. All such modifications and equivalents thereof are covered by the following claims.

What is claimed is:

1. A method and control strategy for controlling upshifts in the gearing of a multiple-ratio automatic transmission for an automotive vehicle including an electronic controller and clutch and brake means for establishing torque delivery paths from an engine to a torque output shaft, the electronic controller including a manual upshift sequence operating mode having automatic upshift controls responsive to engine and transmission operating variables, the vehicle having traction wheels drivably connected to the torque output shaft, and driver-operated wheel brakes;

the method and strategy comprising the steps of enabling a manual upshift mode including a control routine under the control of the driver as the vehicle brakes are applied;

upshifting the transmission manually as the wheel brakes are released and the vehicle accelerates from a standing start;

disabling the manual upshift control routine by applying the wheel brakes;

and enabling automatic upshift controls in response to application of the wheel brakes.

2. A method and control strategy for controlling upshifts in the gearing of a multiple-ratio automatic transmission for an automotive vehicle including an electronic controller and clutch and brake means for establishing torque delivery paths from an engine to a torque output shaft, the electronic controller including automatic upshift controls responsive to engine and transmission operating variables, the vehicle having traction wheels drivably connected to the torque output shaft, and driver-operated wheel brakes;

the method and strategy comprising the steps of enabling a launch-assist and manual upshift operating mode including a manual upshift control routine under the control of the driver as the wheel brakes are applied;

upshifting the transmission manually as speed ratios are selected in sequence from a low speed ratio to the highest speed ratio in the gearing as the wheel brakes are released and the vehicle accelerates from a standing start;

disabling the manual upshift control routine when the highest speed ratio is selected by the driver; and enabling automatic ratio shift control in response to selection of the highest speed ratio in the gearing during operation in the launch-assist and manual upshift operating mode.

3. A method and control strategy for controlling upshifts in the gearing of a multiple-ratio automatic transmission for an automotive vehicle including an electronic controller and clutch and brake means for establishing torque delivery paths from an engine to a torque output shaft, the electronic controller including automatic upshift controls responsive to engine and transmission operating variables, the vehicle having traction wheels drivably connected to the torque output shaft, and driver-operated wheel brakes;

the method and strategy comprising the steps of enabling a launch-assist operating mode with an automatic speed ratio upshift routine in the gearing as the brakes are applied;

establishing a high speed ratio in the gearing as the brakes are applied and the vehicle is stalled whereby the torque delivered to the wheels is reduced as the brakes are applied;

automatically downshifting the transmission to a low speed ratio as the brakes are released at the beginning of the launch-assist mode.

4. The method and strategy set forth in claim 1 including the step of interrupting the manual upshift sequence operating mode when transmission operating temperature exceeds a predetermined value.

5. The method and strategy set forth in claim 2 including the step of interrupting the launch assist and manual upshift operating mode when transmission operating temperature exceeds a predetermined value.

6. The method and strategy set forth in claim 3 including the step of interrupting the launch-assist operating mode when the transmission operating temperature exceeds a predetermined value.

7. The method and strategy set forth in claim 2 including the step of reducing engine torque at the beginning of the launch-assist and manual upshift operating mode to maintain engine torque below a predetermined value.

8. The method and strategy set forth in claim 3 including the step of reducing engine torque at the beginning of the launch-assist operating mode to maintain engine torque below a predetermined value.

* * * * *